US005201027A

United States Patent [19]

Casini

[11] Patent Number: 5,201,027

[45] Date of Patent: Apr. 6, 1993

[54] ELECTRONIC APPARATUS FOR THE LASER IMPRINTING OF SCREEN-PROCESS PRINTING STENCILS AND THE LIKE

[75] Inventor: Pierangelo Casini, Seregno, Italy

[73] Assignee: M.S. Servizi Informatici S.r.l., Caronno Pertusella, Italy

[21] Appl. No.: 807,363

[22] Filed: Dec. 16, 1991

[30] Foreign Application Priority Data

Dec. 24, 1990 [IT] Italy ........................... 22533 A/90

[51] Int. Cl.[5] ........................................ G06K 15/00

[52] U.S. Cl. ................................ 395/107; 395/101; 101/114

[58] Field of Search ............... 395/101, 106, 107, 109, 395/117; 101/114, 115, 127, 128.4, 129, 171, 211, 489, 483; 346/107 R, 108, 154, 157, 160

[56] References Cited

U.S. PATENT DOCUMENTS 3,974,766 8/1976 Zimmer ........................... 101/129
3,998,156 12/1976 Zimmer ........................... 101/115
4,998,470 1/1990 Klemm ............................ 101/115

*Primary Examiner*—Arthur G. Evans
*Attorney, Agent, or Firm*—Guido Modiano; Albert Josif

[57] ABSTRACT

Electronic apparatus for imprinting screen-process printing stencils, comprising: an electronic device for the color acquisition of the image of a color design so as to obtain information in a digital format which can be stored on a magnetic support; a computer for the management of the data stored on the magnetic support, suitable for allowing to manage the data, i.e. to select the fundamental colors, change them or superimpose them, with simultaneous on-screen display or printout on paper or the like; a computer which is controlled by the management computer and has the functions of controlling the data output by the management computer and of preparing the image for being imprinted; at least one microprocessor-based device with driving and synchronizing functions, which is suitable for translating the data output by the control computer into electric signals which are synchronized with a mirror scanning system for orientating the beam of the LASER onto the support to be imprinted and for modulating the intensity of the beam according to the position assumed thereby on the plane of the support to be imprinted; and a scanning system composed of at least one mirror which can be orientated by means of a galvanometer controlled by the control computer.

5 Claims, 1 Drawing Sheet

ELECTRONIC APPARATUS FOR THE LASER IMPRINTING OF SCREEN-PROCESS PRINTING STENCILS AND THE LIKE

BACKGROUND OF THE INVENTION

The present invention relates to an electronic apparatus for the direct imprinting of color designs on stencils for screen-process printing by means of the electronic processing of the image which corresponds to the design to be printed and of the subsequent use of a beam of LASER rays to optically imprint the design on the textile support of the printing stencil.

As is known, the method currently most used for optically imprinting color designs on planar screen-process printing stencils entails, initially and in any case, the manual preparation of a color design by experts and then the creation, starting from said design, of a series of tracing sheets (or transparent films) whose number is equal to the number of colors of the design; the area which corresponds to a single color considered fundamental in that given design is defined in black on each of said tracing sheets or films. Accordingly, each black area of each transparent tracing sheet corresponds to a single fundamental color which will subsequently be used during printing in order to reproduce the original colored design.

These color areas can be partially superimposed so as to generate regions of a color which is the superimposition of one or more fundamental colors, thus allowing to keep the number of fundamental colors as small as possible. The images present on the tracing sheets are then transferred onto a support which allows to print them on fabric, i.e. a printing stencil. Said support is constituted by a rectangular frame, generally constructed by means of metallic profiled elements, over which a polyester fabric is stretched and glued. Said stencil is then impregnated with a particular light-sensitive gelatine and dried. Once dry, the printing stencil is optically imprinted by superimposing thereon one of said individual tracing sheets bearing the design to be transferred and by exposing the assembly to the light of a mercury-vapor lamp which contains a very intense ultraviolet component with an emission peak centered around 360 nm.

The part of gelatine which is struck by the ultraviolet light polymerizes and thus remains fixed to the supporting fabric, whereas the remaining part can be eliminated from the stencil by means of a simple wash with water.

In order to obtain a greater mechanical strength of the stencil during printing, said stencil is subsequently varnished, and the varnish which fills the design is removed by means of appropriate aspiration.

Due to the fact that during printing the fabric must generally be dried between the printing of one color and the printing of the next, it is evident that the production times (as well as the possible inaccuracies in the final result) decrease as the number of printed color overlays decreases, and therefore this justifies the need to reduce as much as possible the colors which can be considered fundamental for the forming of a given design.

An intermediate "tiling" step, i.e. a step in which the same area of the design is duplicated according to a given geometrical arrangement, may occur between the tracing and the related imprinting, with the purpose of completely filling the useful area of the printing stencil.

A manual "blending" operation, i.e. a modification of the outline of the design on the stencil so as to allow the best possible matching of the right and left sides of the image, which will have to match during printing, is often performed after imprinting.

Once the printing stencils have been obtained, the design is printed on fabric, using the colors considered most appropriate for each color overlay, thus acquiring the possibility of obtaining a plurality of "variations" of the same design. The person who selects the colors which must replace the original ones to print a given variation is always highly specialized.

This optical imprinting method, which comprises the manual preparation of the color design, the transfer of said design onto tracing sheets or transparent film and all the subsequent manual operations for reducing the number of fundamental colors and for adapting the size of the tracing sheets to the size of the support to be optically imprinted, in practice has problems and limitations which are mostly due to the need to perform a number of separate copies of the same design on tracing sheets which is equal to the number of colors considered fundamental, to the need to have highly specialized personnel available and to the considerable time required for the transfer of the original design onto tracing sheets, with evident high costs and low productivity.

In order to at least partially obviate these problems and the numerous manual interventions, various attempts have already been made to provide the process for the automatic imprinting of the textile support of a screen-process printing stencil starting from digital information, corresponding to the shape and color characteristics of the design to be printed, which can be processed by means of a computer so as to drive an ultraviolet light source in order to transfer the image of the design (or of parts thereof) onto the light-sensitive material spread on the support of the printing stencil.

However, in practice the imprinting method which uses digital information which can be processed on a computer has proved itself difficult to execute in practice and unsuitable for the optical imprinting of color designs on large supports.

SUMMARY OF THE INVENTION

Therefore, the aim of the present invention is to provide a semiautomatic apparatus for the direct imprinting of color designs on supports which constitute planar printing stencils, using the method of electronic image processing and a LASER light source, structured so as to allow the direct transfer of the manually prepared color design onto the textile support of the printing stencil in a substantially automatic manner, with no manual intervention and most of all without requiring the production of tracing sheets or transparent films on which the areas covered by each color present in the original design are colored black, with evident significant practical and economic advantages as well as advantages in precision of execution.

Another object of the invention is to provide an electronic apparatus for the optical imprinting of textile supports, metallic supports or the like, conceived so as to allow to perform possible variations in the design and in the number of colors, simultaneously with a direct on-screen display, allow to store the information related to the design on a magnetic support so that said information can be used on any computer, even after its acquisition, and allow to print onto small-size tracing sheets or paper the various color regions which compose the design in order to allow to imprint small test stencils.

A further object of the invention is to provide an electronic optical imprinting apparatus which allows to transfer color designs having large dimensions, such as those generally required by the users of printing machines with planar stencils for textile products and the like, onto fabric or metallic supports.

This aim, these objects and others which will become apparent from the following description are achieved by a electronic apparatus for imprinting printing stencils and the like, which uses the method of electronic image processing and an ultraviolet LASER light source, said apparatus comprising, according to the invention:

an electronic device for the color acquisition of the image of a manually prepared color design so as to obtain the information in a digital format which can be stored on a magnetic support;

a computer for the management of the data stored on said magnetic support, which is suitable for allowing the user to manage said data, i.e. to select the fundamental colors, change them and partially superimpose them, with simultaneous on-screen display or printout on paper or the like;

a further computer which is controlled by the management computer and has the functions of controlling the data output by the management computer and of preparing the image for imprinting;

at least one microprocessor-based device with driving and synchronizing functions which is suitable for translating the data output by said control computer into electric signals which are synchronized with a mirror scanning system for orientating the beam of said LASER in any point of the plane of the support to be imprinted and for modulating the intensity of said LASER beam according to the position assumed thereby on the plane of the support, as well as a scanning system constituted by at least one mirror which is arranged on the optical axis of the LASER beam and can be orientated by virtue of motor means, such as a galvanometer or the like controlled by said control computer by means of an analog circuit.

More particularly, and according to a preferred embodiment, said LASER beam scanning system is constituted by two mutually orientatable mirrors and comprises a first galvanometer which orientates one mirror so as to position the LASER beam along one axis, a second galvanometer for orientating the other mirror so as to position the beam along the other axis, perpendicular to the first axis in the same plane, and a third galvanometer for controlling the position, along the optical axis of the beam, of a focusing lens in order to continuously correct its focusing distance.

Each galvanometer is furthermore equipped with its own analog circuit which converts the digital position signals, which are in the form of binary numbers in output from said microprocessor-based device, into voltage levels applied to the windings of the galvanometers or of said motor means.

BRIEF DESCRIPTION OF THE DRAWINGS

Further characteristics and advantages of the present invention will become apparent from the following detailed description of a preferred practical embodiment thereof, given with reference to the accompanying drawing, provided only by way of non-limitative example, and wherein.

DESCRIPTION OF THE PREFERRED EMBODIMENTS

With reference to the above figures, and as already mentioned earlier, the apparatus according to the invention is conceived and structured so as to automate almost all the manual operations required by the imprinting method currently in use.

According to the present invention, the apparatus in fact uses a particular system for the electronic processing of the image, i.e. of a color design prepared manually by an expert, and a LASER rays apparatus equipped with a particular system for positioning the LASER beam in any point of the support in order to transfer, in a known manner, the original design from the support onto fabric, plastic or the like.

Figure 1:
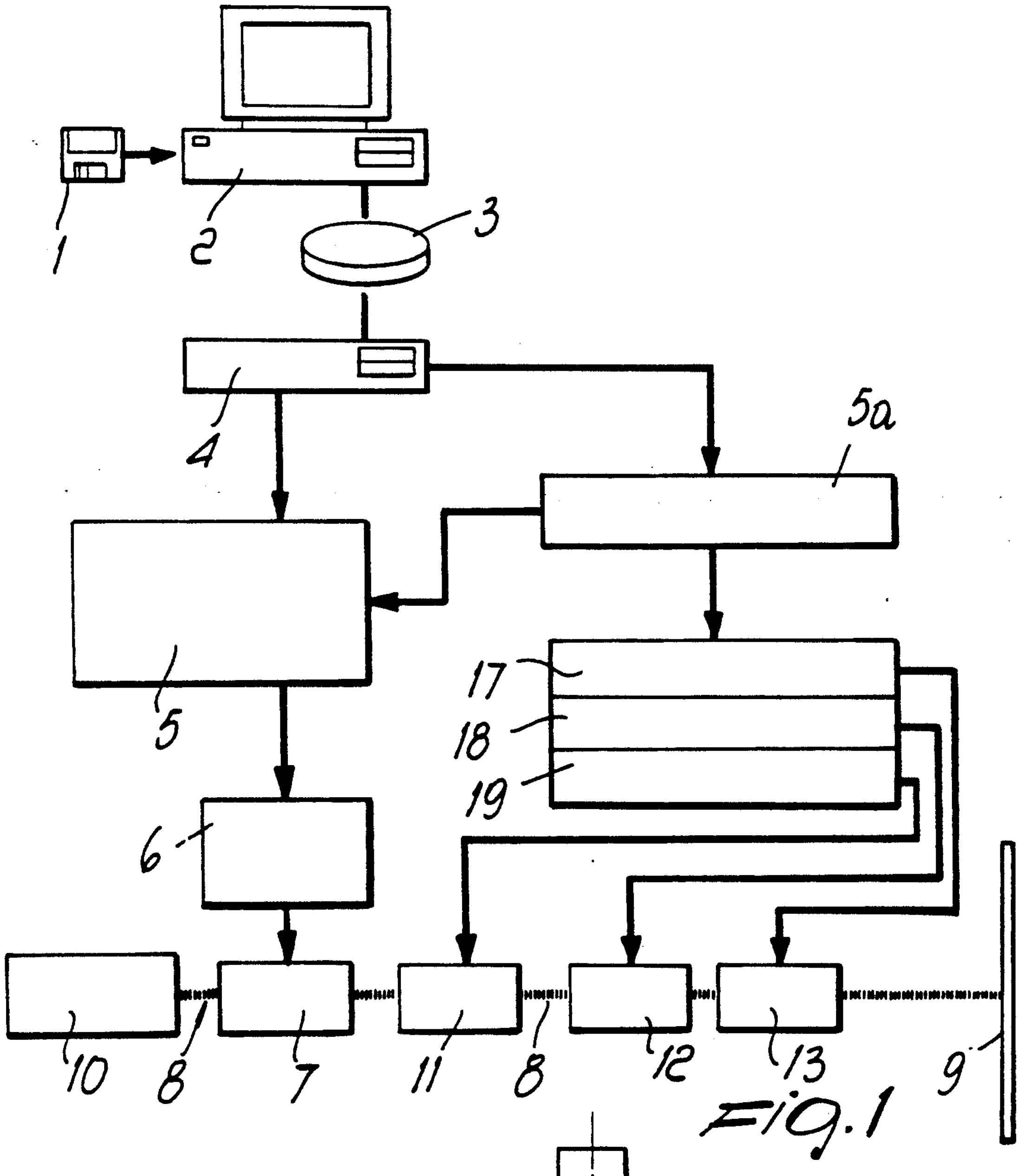
FIG. 1 is a block diagram of the electronic, optical and mechanical components which constitute the imprinting apparatus according to the present invention.

Said apparatus initially comprises a electronic device for the color acquisition of the image, which is of a known type and is not illustrated in the figures, and the transfer of the data in digital format obtained from the acquisition onto a magnetic support 1, for example a magnetic tape or disk (FIG. 1).

Said support 1 bearing the acquired data is used in a management computer 2 equipped with a screen and possibly with a color or thermal printer whose function is to allow the operator to perform various preliminary operations suitable for preparing the image which will subsequently be imprinted on the textile support of a planar printing stencil. Said operations consist, for example, in a preliminary reduction of the number of acquired colors, reducing them to a number preset by the user, in displaying on the screen the colors acquired by the optical acquisition device in order to obtain the number of color overlays required by printing, in performing superimpositions among the various color overlays and also in modifying the colors in order to include them within the range of colors which is available at the printing facilities and is assuredly producible. Other operations possible with said management computer 2 can consist in the possibility of varying the original colors and of then printing them on paper with a color printer or even on small-size tracing sheets with a thermal printer in order to allow the direct imprinting of small test stencils.

All the information related to th original design and to the design possibly modified as regards the number and type of the colors by means of said management computer 2 are in digital format (binary coding), so that when they are output by said computer they are stored in a mass storage device 3.

A control computer 4 is connected to said mass storage device 3, and its task is to read the data which compose the various color overlays (which correspond to the tracing sheets provided for each fundamental color of the known art) and then allow the operator to assign or vary certain parameters related to imprinting, for example the dimensions of the required printing stencils, the thickness of the related frames and those related to the possible tiling and/or blending (i.e. repetition of the same design on the same textile support) and those related to the operation and control of the mirror scanning system which will be described hereinafter.

A further computer 5 arranged downstream of the control computer 4 has the specific task of transforming the data in digital format processed and prepared in said control computer 4 into electric signals which are synchronized with the movement of the mirrors, and of driving, by means of a device 6, an optical modulator 7 of the LASER beam so as to be able to reproduce the original design on the support of the stencil by appropriately modulating the intensity of the LASER beam 8 according to the position assumed thereby on the support 9 to be imprinted.

A digital electronic device 5a is also arranged at the output of said control computer 4 and is substantially a microprocessor-based digital computer which is suitable for converting the positioning commands in output from the control computer 4 into coordinates of the scanning device, as described in greater detail hereinafter, and for controlling the optical modulation according to the scanning of the LASER beam.

Figure 2:
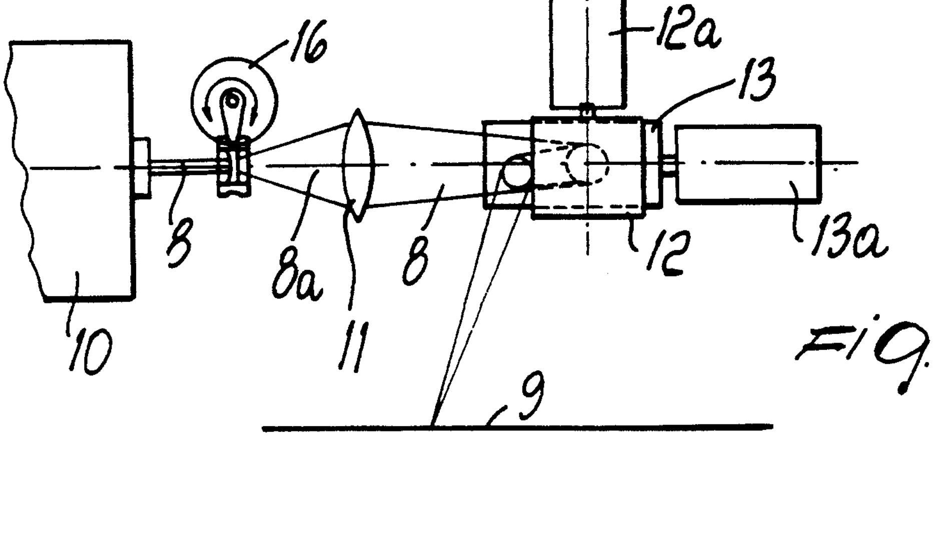
FIG. 2 is a schematic view of the structure of the scanning system with mirrors suitable for positioning the LASER beam in any point of the working surface.

Downstream of this electronic processing system, the apparatus according to the invention has, on a supporting structure, a LASER source 10 (FIG. 1), an optioal modulator 7, and a focusing lens 11 for the beam, whose axis is directed onto two orientatable scanning mirrors 12 and 13 which constitute a system for linear scanning along two mutually perpendicular directions As shown structurally by FIG. 2, said scanning system is constituted by three units, i.e.: a galvanometer 12a which is suitable for rotatng and positioning the mirror 12 so as to position the LASER beam along one axis; a second galvanometer 13a which is suitable for positioning the mirror 13 so as to position said LASER beam along another axis which is perpendicular to the preceding one; and a third galvanometer 16 which is suitable for controllinq the position, along the optical axis 8a, of the lens 11 which belongs to the beam expander, so as to correct the focusing distance of the beam with respect to the support 9 to be imprinted.

An analog converter is associated with each galvanometer and is suitable for transforming the digital position inputs, in the form of binary numbers, into voltage levels to be applied to the windings of said galvanometers.

For this purpose, said microprocessor-based digital processing circuit 5a is provided upstream of said three galvanometers and is suitable for converting, as specified above, the commands for the positioning of the scanning mirrors into coordinates for said mirrors, simultaneously also correcting any geometrical positioning errors related to the type of scanning adopted, and for then transferring the data related to said coordinates to the electronic driving circuits of the galvanometers, said circuits being indicated by 17, 18 and 19 in FIG. 1; in particular, the electronic circuit 17 is provided in order to drive the galvanometer of the slowest mirror 13, the circuit 18 is provided for the galvanometer 12a of the fastest mirror 12 and the circuit 19 is provided for the galvanometer 16 which controls the position of the lens 11.

From what has been described above, it is evident that the apparatus for optically imprinting color designs by means of LASER light and without requiring the transposition of the designs onto tracing sheets or transparent films leads to results which are identical to, and often even better than, those obtainable with the conventional method; the LASER ray is in fact moved ove the surface of the textile support to be imprinted along successive lines, i.e. one line after the other, interrupting the emission of the beam every time a point of the design on which the beam is going to pass belongs to the design, i.e. to a color overlay, which, as is known, must not be subjected to polymerization.

Furthermore, with this scanning system the positioning of the support 9 to be imprinted must be such as to ensure a precise positional reference, since the various printing stencils, each of which bears a color overlay of the basic design, must then be perfectly superimposable, during printing, on the fabric to be printed; the supporting structure of the support 9 to be imprinted must equally be executed so that it can be thermostat-controlled in order to reduce superimposition errors caused by thermal expansions.

The apparatus described above according to a practical embodiment thereof is susceptible to structurally and functionally equivalent modifications and variations, always according to the invention.

Thus, for example, the beam scanning system, instead of having two mirrors so that it can arrange itself anywhere on a plane, may be provided so as to position itself only along a line, in this case using a single mirror with the related galvanometer and moving the stencil with mechanical means along the other axis, preferably the slow one, or moving the scanning system with respect to the stencil.

A further variation relates to the possibility of performing the line scan by using the reflection of the LASER beam by the lateral faces of a polygonal prism which rotates at a preset speed; in this case, however, it is necessary to modify the system for geometrical error correction and the focusing system, since the rotation of the mirror no longer occurs with respect to an axis which substantially passes through the surface of said mirror but about an axis which is arranged at a considerably greater distance.

Another solution might be to optically imprint small rectangles of the design by using the light of a conventional ultraviolet lamp focused through a transparent LCD screen in which, by means of the computer, it is possible to make individual points of the LCD screen opaque; it is then necessary to ensure precise relative positioning between the stencil and the LCD screen.

Finally, besides producing the image on the support 9 to be imprinted by photopolymerization, the apparatus according to the invention allows to perform:

thermopolymerization on a polyester support;

thermopolymerization on a metallic fabric support;

sublimation of particular resins deposited on metallic fabric, and to perform a process which is the inverse of the conventional one, according to which the part of chemical product which is not exposed to ultraviolet light is polymerized and the exposed part is washed away (the opposite currently occurs).

In addition to the above described variations, the invention as described is furthermore susceptible to further structurally and functionally equivalent variations and modifications without abandoning the scope of the protection of said invention.

I claim:

1. Electronic apparatus for imprinting screen-process printing stencils and the like, using the method of electronic image processing and a LASER light source, comprising:

an electronic device for the color acquisition of the image of a manually prepared color design, so as to obtain the information in a digital format which can be stored on a magnetic support;

a computer for the management of the data stored on said magnetic support. suitable for allowing the user to manage said data, i.e. to seleot the fundamental colors, change them and partially superimpose them, with simultaneous on-screen display or printout on paper or the like;

a further computer which is controlled by the management computer and has the functions of controlling the data output by the management computer and of preparing the image for imprinting;

at least one microprocessor-based device with driving and synchronizing functions, which is suitable for translating the data output by said control computer into electric signals which are synchronized with a mirror scanning system for orientating the beam of said LASER toward any point of the plane of the support to be imprinted and for modulating the intensity of said LASER beam according to the position assumed thereby on the plane of the support, as well as a scanning system constituted by at least one mirror which is arranged on the optical axis of the LASER beam and can be orientated by virtue of motor means, such as a galvanometer or the like, controlled by said control computer by means of an analog circuit.

2. Apparatus according to claim 1, wherein said LASER beam scanning system is constituted by two mutually orientatable mirrors and comprises: a first galvanometer, which orientates a mirror so as to position the LASER beam along one axis; a second galvanometer, for orientating the other mirror so as to position the beam along the other axis, perpendicular to the first axis in the same plane; and a third galvanometer, for controlling the position of a focusing lens along the optical axis of the beam in order to continuously correct its focusing distance.

3. Apparatus according to claim wherein each galvanometer is equipped with an analog circuit of its own which converts the digital position inputs, which are in the form of binary numbers in output from said microprocessorbased device, into voltage levels applied to the windings of the galvanometer.

4. Apparatus according to claim 2, wherein a microprocessor-based digital computer is provided upstream of said three galvanometers and is suitable for converting the mirror positioning commands in output from said control computer into coordinates of the beam scanning system and also for allowing to correct any geometrical beam positioning errors, said coordinates being then sent to said electronic circuits for driving the galvanometers.

5. Apparatus according to claim 1, wherein it allows to produce the image on a textile support not only by optical imprinting but also by thermopolymerization on a polyester support and thermopolymerization on a support made of metallic fabric.

* * * * *